(12) United States Patent
Kissel, Jr.

(10) Patent No.: US 7,193,190 B2
(45) Date of Patent: Mar. 20, 2007

(54) PORTABLE PLATE WARMING APPARATUS WITH RECHARGEABLE BATTERY

(76) Inventor: Waldemar F. Kissel, Jr., 3129 NW. 57thTer., Gainesville, FL (US) 32606

(*) Notice: Subject to any disclaimer, the term of this patent is extended or adjusted under 35 U.S.C. 154(b) by 0 days.

(21) Appl. No.: 11/283,060

(22) Filed: Nov. 18, 2005

(65) Prior Publication Data

US 2006/0108351 A1    May 25, 2006

Related U.S. Application Data

(60) Provisional application No. 60/630,189, filed on Nov. 19, 2004.

(51) Int. Cl.
*H05B 3/06* (2006.01)

(52) U.S. Cl. .................. 219/521; 219/386; 219/450.1; 219/465.1; 99/446; 99/470

(58) Field of Classification Search ................ 219/386, 219/521, 450.1, 465.1; 99/446, 420; 342/439
See application file for complete search history.

(56) References Cited

U.S. PATENT DOCUMENTS

| | | | |
|---|---|---|---|
| 2,770,704 A * | 11/1956 | Razlag | ........................ 392/439 |
| 4,246,884 A | 1/1981 | Vandas | |
| 5,003,159 A * | 3/1991 | Thorson | ...................... 219/386 |
| 5,524,528 A * | 6/1996 | Yeh | ............................. 99/446 |
| 5,546,851 A * | 8/1996 | Goto | ........................... 99/446 |
| 6,252,204 B1 * | 6/2001 | Po-Hei | ..................... 219/450.1 |
| 6,279,470 B2 * | 8/2001 | Simeray et al. | ............... 99/470 |
| 6,831,256 B2 * | 12/2004 | Haasis et al. | ............ 219/465.1 |
| 6,841,764 B2 | 1/2005 | Fuchs | |

* cited by examiner

*Primary Examiner*—Robin Evans
*Assistant Examiner*—L Fastovsky
(74) *Attorney, Agent, or Firm*—Holland & Knight LLP

(57) ABSTRACT

Disclosed is a plate warming apparatus for use in keeping food warm in a restaurant. The invention has four primary components: a serving plate; a heater assembly; a plate adapter for coupling the plate and heater assembly; and a base fixture that enables the adapter to be selectively coupled to the heater assembly. These elements allow the heater assembly to heat the underside of a serving plate and, thereby, keep food warm as it is delivered to and consumed at a user's table. The invention allows the heater assembly to be uncoupled from the underside of the plate and recharged as necessary for reuse on other serving plates.

8 Claims, 5 Drawing Sheets

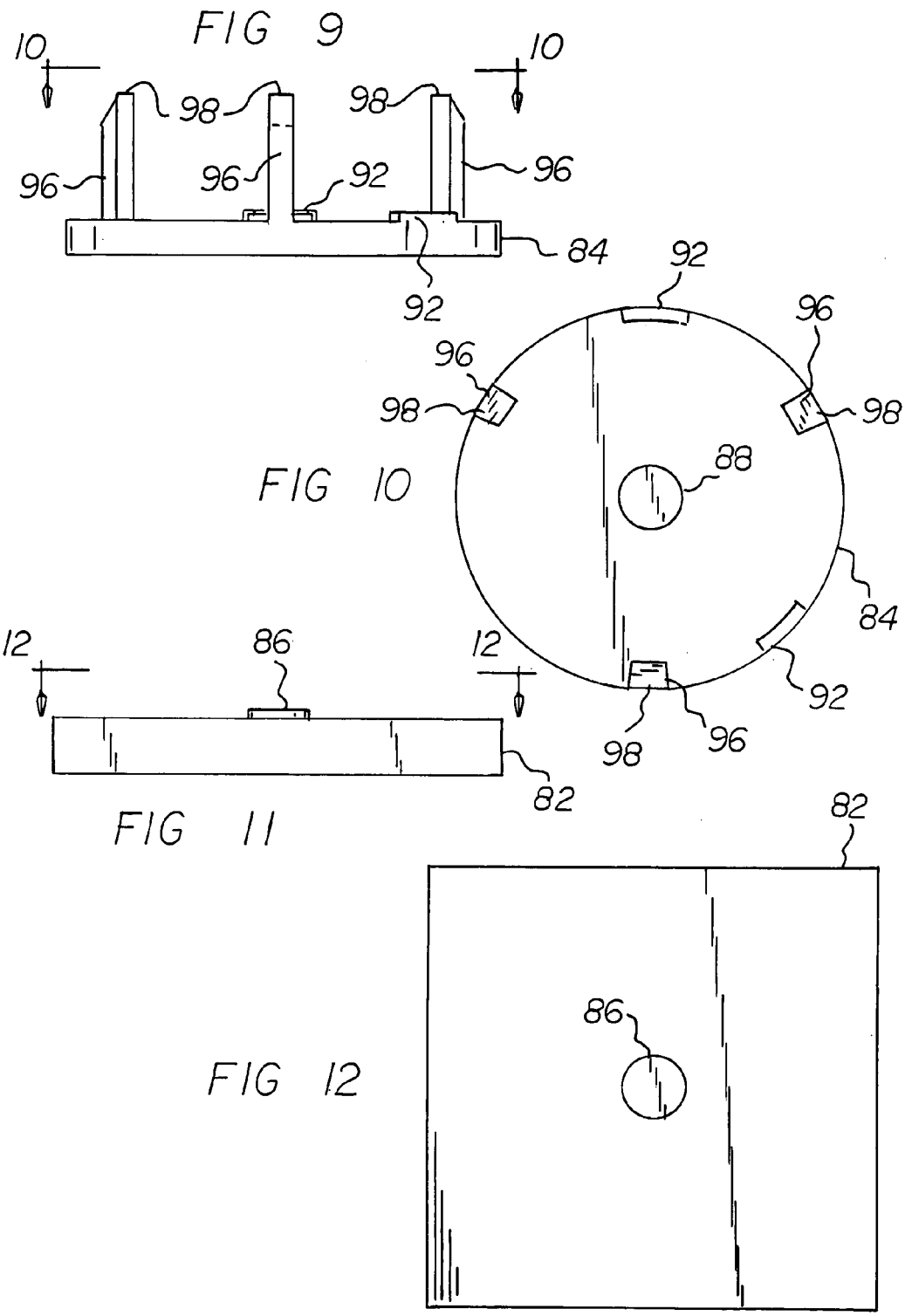

PORTABLE PLATE WARMING APPARATUS WITH RECHARGEABLE BATTERY

RELATED APPLICATION DATA

This application claims priority from and is related to commonly owned U.S. Provisional Patent Application Ser. No. 60/630,189 filed on Nov. 19, 2004 and entitled Portable Plate Warming Apparatus with Rechargeable Battery, the contents of this application are fully incorporated herein.

BACKGROUND OF THE INVENTION

1. Field of the Invention

This invention relates to an assembly for keeping food warm in restaurants, or in homes, for catering, or for hot food delivery services from restaurant to office or home. More particularly, the present invention relates to a portable, self-contained, rechargeable heating element that can be removably coupled to the underside of a serving plate.

2. Description of the Background Art

Keeping food warm prior to its delivery to a customer, as well as keeping food palatably warm during its consumption, is a continual source of frustration for restaurants and diners. Even under the most ideal settings, there is often a delay between the time food is cooked and the time it reaches the table. Equally important is that food turns cold before the meal is fully consumed. The result is a tepid or cold meal that almost all consumers find objectionable. Even a slight drop in temperature can destroy an otherwise carefully prepared and gourmet meal. Whatever the reason, the failure to keep food warm most certainly results in a less enjoyable dining experience for the customer, reduced referrals and a loss of customers.

In light of this problem, restaurants have devised a number of different methods in an effort to keep meals warm. One simple solution is to cover the serving plate to prevent temperature loss. Such covers, however, have at least three drawbacks. First, covers simply act as insulators and do not provide an independent heat source. Second, covers often obscure a server's view of the serving plate, thereby complicating the task of getting the right order to the right customer. Third, such covers do nothing to keep food warm after it has been served.

Another common solution is to use heating lamps to heat the food prior to its delivery. However, heating lamps also have their drawbacks. For instance, lamps only provide heat during the time the food is actually beneath the lamp. As a result, food loses temperature both before it is put under the lamp and while it is being carried to a customer's table. Heating lamps also have the unfortunate tendency of drying out foods and also do nothing to keep food warm as it is being consumed.

Thus, there exists a continuing need in the art to provide an efficient and portable means for maintaining the temperature of food while it is served and consumed within restaurants, homes, or for delivery or whenever.

SUMMARY OF THE INVENTION

It is therefore one of the objectives of this invention to provide a portable device for heating a restaurant or home serving plate.

It is also an object of this invention to provide a portable heating element that is safe to be used by both consumers and restaurant employees.

Still another object of this invention is to provide a portable food warming apparatus that can be used in conjunction with a restaurant's or home's existing serving plates, although serving plates with the apparatus designed as an integral part is an obvious alternate embodiment.

These and other objectives are accomplished by providing a sealed heater assembly with an internal battery supply or fuel cell (such as a proton exchange fuel cell) that can be recharged via an electromagnetic field or electric current. The heater assembly is adapted to be interconnected to a serving plate by way of a plate adapter. The plate adapter, in turn, is connected to the heater assembly by a series of legs that can be selectively coupled or uncoupled from the heater assembly via a base fixture.

The foregoing has outlined rather broadly the more pertinent and important features of the present invention in order that the detailed description of the invention that follows may be better understood so that the present contribution to the art can be more fully appreciated. Additional features of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claim.

BRIEF DESCRIPTION OF THE DRAWINGS

For a fuller understanding of the nature and objects of the invention, reference should be had to the following detailed description taken in connection with the accompanying drawings in which:

FIG. 9 is a side elevational view of an alternative base fixture according to the present invention.

FIG. 10 is a plan view taken along line 10—10 of FIG. 9.

FIG. 11 is a second component to the alternative base fixture of FIGS. 9–10.

FIG. 12 is a plan view taken along line 12—12 of FIG. 11.

Similar reference characters refer to similar parts throughout the several views of the drawings.

DETAILED DESCRIPTION OF THE PREFERRED EMBODIMENT

The present invention relates to a plate warming apparatus for use in keeping food warm in a restaurant, home or wherever food is served. The invention has four primary components: a serving plate; a heater assembly; a plate adapter for coupling the plate to the heater assembly; and a base fixture. These elements allow the heater assembly to heat the underside of a serving plate and keep food warm as it is delivered to a user's table or while it is being consumed. The invention allows the heater assembly to be uncoupled from the underside of the plate and recharged as necessary. This allows fewer heaters to be used than there are plates or plate styles. The various components of the present invention, and the manner in which they interrelate, will be described in greater detail hereinafter.

Figure 1:
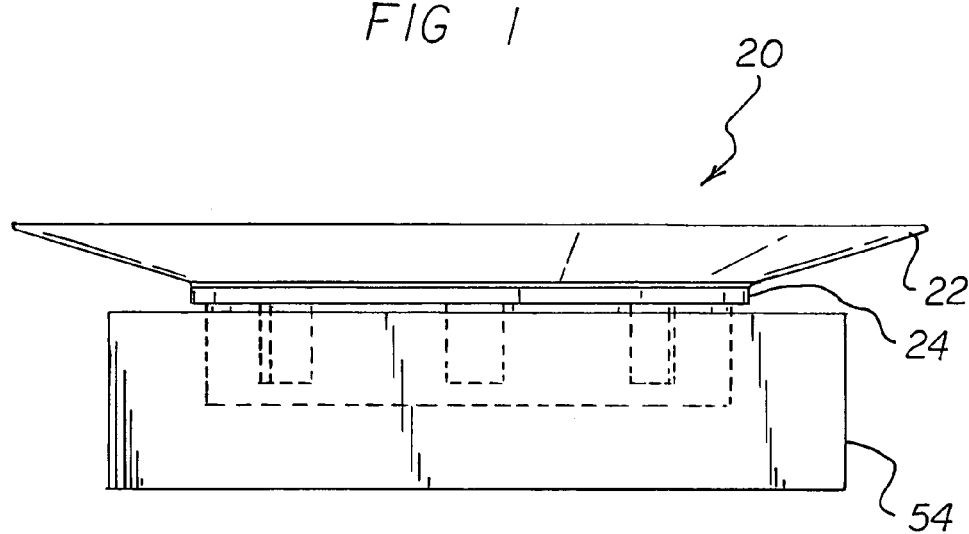
FIG. 1 is a side elevational view of the plate warming apparatus of the present invention, with the dotted lines indicating the relationship between the legs of the adapter and the heater assembly.
Figure 2:
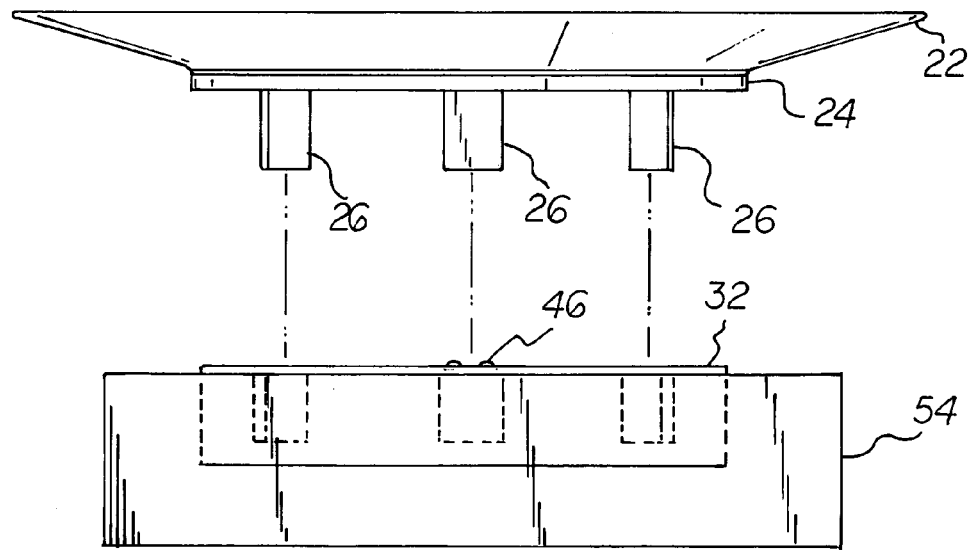
FIG. 2 is a partially exploded view of the heating assembly of FIG. 1.

With reference now to FIG. 1, the plate warming apparatus 20 is depicted. The apparatus 20 includes a serving plate 22 that can be an existing restaurant plate and need not be especially configured to carry out the purposes of the present invention. In other words, the present invention can be retro-fitted to existing dishware. A plate of any shape or size can be used in conjunction with the invention. By using existing serving plates, the present invention can be employed with a minimum of cost. This also allows flexibility for use in the home because this present invention can be used interchangeably with whatever style and decorated serving plates are preferred.

Figure 3:
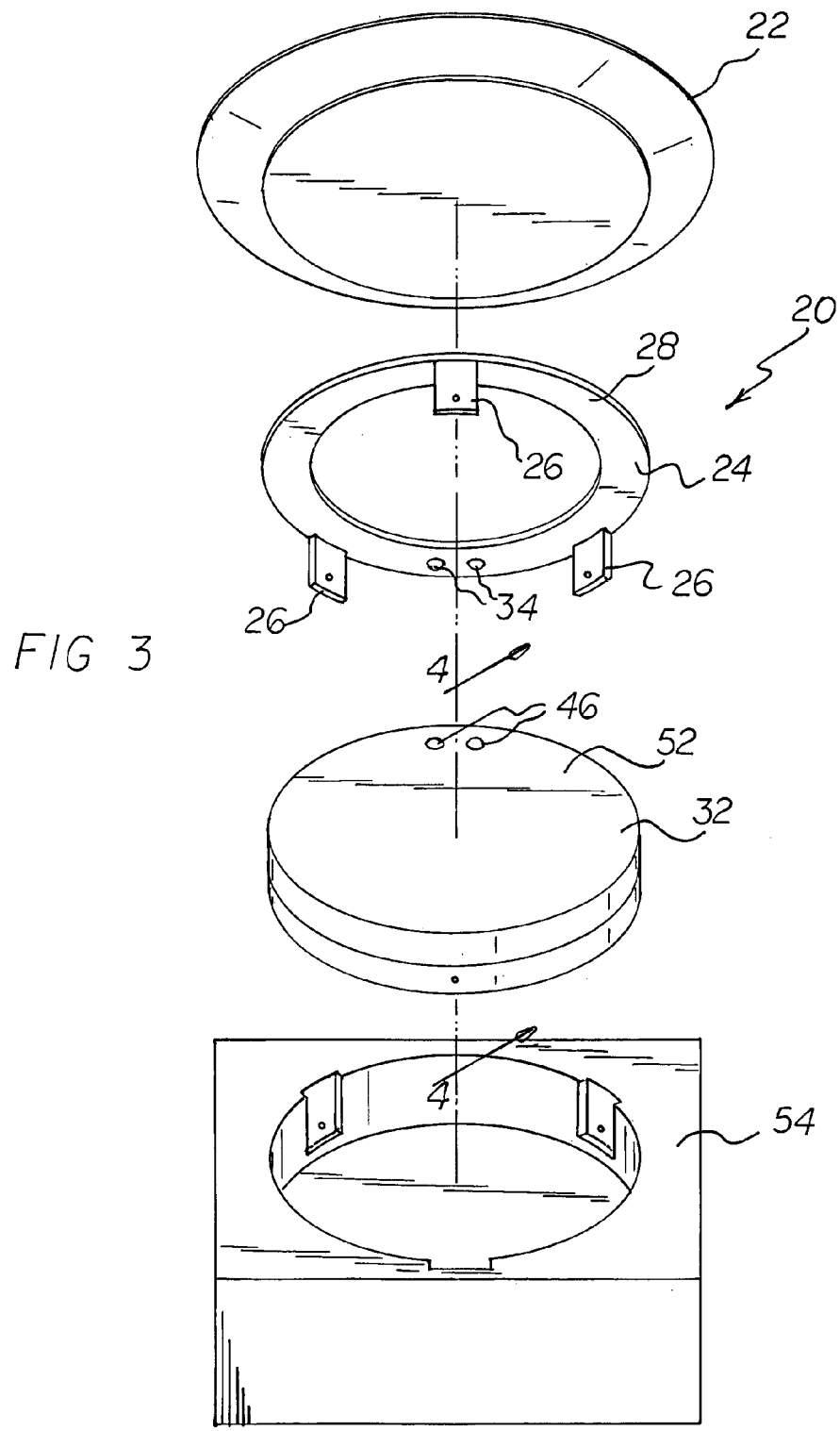
FIG. 3 is an exploded view showing the four components of the plate warming apparatus: serving plate; plate adapter; heater assembly; and base fixture.

The exploded view of FIG. 3 most clearly illustrates the interrelationship of the various components of the present invention. More specifically, FIG. 3 illustrates how the plate adapter 24 is secured to the underside of serving plate 22. Plate adapter 24 can be formed from a plastic or metallic material, and can be configured into any of a number of shapes. In the preferred embodiment of FIG. 3, adapter 24 is configured as a ring that is similar in shape to the underside of serving plate 22. Again, different adapter configurations can be employed to accommodate various plate styles.

In the preferred embodiment, a glue (not shown) is used to secure plate adapter 24 to the underside of serving plate 22. The glue, once set, is preferably strong enough to prevent the unintended removal of plate adapter 24 from plate 22, but it should not be so strong as to form a permanent bond. The ideal glue is selected such that it can be dissolved via a suitable solvent to allow the plate 22 to be uncoupled from adapter 24. This gives the restaurant the option of using its plates either in a conventional fashion or using them in conjunction with the present invention. Although glue has been described, adapter 24 can be secured in a number of other ways, both fixed and unfixed, as will be readily understood by those skilled in the art.

Plate adapter 24 further includes a number of legs 26 that extend downwardly from a circular base 28. In the embodiment depicted in FIG. 3, three such legs 26 are included. Each of these legs includes an aperture at its distal end that is used in securing plate adapter 24 to the heater assembly 32 in a matter more fully described hereinafter. Finally, plate adapter 24 includes a pressure switch 34 for use in completing a circuit within heater assembly 32.

Figure 4:
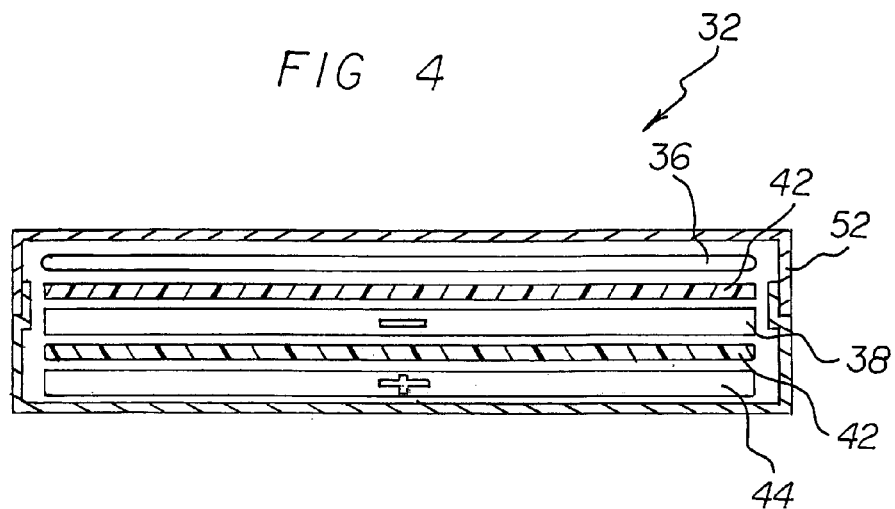
FIG. 4 is a sectional view taken along line 4—4 of FIG. 3 showing the internal components of the heater assembly.

Heater assembly 32 of the present invention is described next in conjunction with FIGS. 3 and 4. In the preferred embodiment, heater assembly 32 takes the form of a disc with a 10-inch diameter and a thickness of between ½ to ¾ inches. However, the exact shape and dimensions of heater assembly 32 will depend in large part on the shape and size of the serving plate it is heating. Thus, although preferred sizes and shapes have been depicted and described, the present invention is in no way limited to any exact size or geometry.

Once coupled to plate 22 via adapter 24, heater assembly 32 heats the underside of plate 22. The heat is generated by way of a heating coil or element 36 in the interior of heater assembly 32 (note FIG. 4). The interior of heater assembly 32 further includes a rechargeable battery 38, opposing electrodes 42, and an insulator 44 in a manner known in the art. Electrodes 42 can take any number of different configurations. For example, the electrodes could be in either liquid or solid form. If solid, they could be very thin discs placed one on the other and separated by an insulator. Alternatively, the electrodes could be semicircles placed opposite one another. Still yet another option is to provide one electrode in the form of a hollow disc with the other electrode being positioned within the disc. Those of ordinary skill in the art will appreciate additional electrode configurations.

Although the present invention has been described as employing a rechargeable battery, it is within the scope of the present invention to utilize non-rechargeable, disposable batteries. It is also within the scope of the present invention to utilize a known, conventional battery supply within the heater assembly.

Heater assembly 32 further includes a pressure switch 46 that is adopted to mate with pressure switch 34 of plate adapter 24 to complete a circuit within heater assembly 32. The circuit within heater assembly 32 includes the mating pressure switches (34 and 46), battery 38, electrodes 42, and heating coil 36. When switches 34 and 46 are closed, battery 38 supplies electricity to heating coil 36, which, in turn, is used to heat the underside of serving plate 22. The entire circuit is enclosed within a fluid-tight container 52.

Heater assembly 32 is removably coupled to plate adapter 24 by way of a base fixture 54. Specifically, plate adapter 24 can only be coupled to, or uncoupled from, heater assembly 32 when heater assembly 32 is positioned within base fixture 54. In other words, base fixture 54 acts as a kind of key for selectively coupling or uncoupling adapter 24 and heater 32. This is both a safety feature and a means of theft deterrence, as a customer will be unable to separate heater assembly 32 from adapter 24 or plate 22 without base fixture 54. There are a variety of mechanisms that can be employed within base fixture 54 for carrying out this objective.

The coupling arrangement depicted employs fastening elements that are either selectively inserted into or removed from adapter 24 and heater 32 via base fixture 54. In this embodiment, adapter legs 26 all include small apertures that can be aligned with corresponding apertures within heater assembly 32. Additionally, base fixture 54 includes slots adapted to receive the legs 26 of the plate adapter 24. Base fixture also includes a recess adapted to receive heater assembly 32. With plate adapter 24 and heater assembly 32 properly positioned within base fixture 54, the coupling mechanism within fixture 54 is actuated to supply a fastener through each of the corresponding apertures of legs 26 and heater 32. This couples heater 32 to adapter 24. In a similar fashion, with heater 32 and adapter 24 within fixture 54, the coupling mechanism can be again actuated to remove the fasteners to allow the components to be separated. Those of ordinary skill in the art will appreciate other means of interconnection. For example, plate adapter 24 could be removably coupled to heater assembly 32 by way of a friction fit, with base fixture 54 facilitating the friction fit. In another embodiment, legs 26 of plate adapter 24 could be inserted within corresponding openings within an upper surface of heater 32 with the removal or insertion of legs 26 only being permitted with heater 32 positioned within base fixture 54.

As is evident from FIG. 3, coupling adapter 24 to heater 32 results in pressure switches 34 and 46 being closed, the completion of the circuit within heater 32, and the heating of heating coil 36 and serving plate 22.

Figure 5:
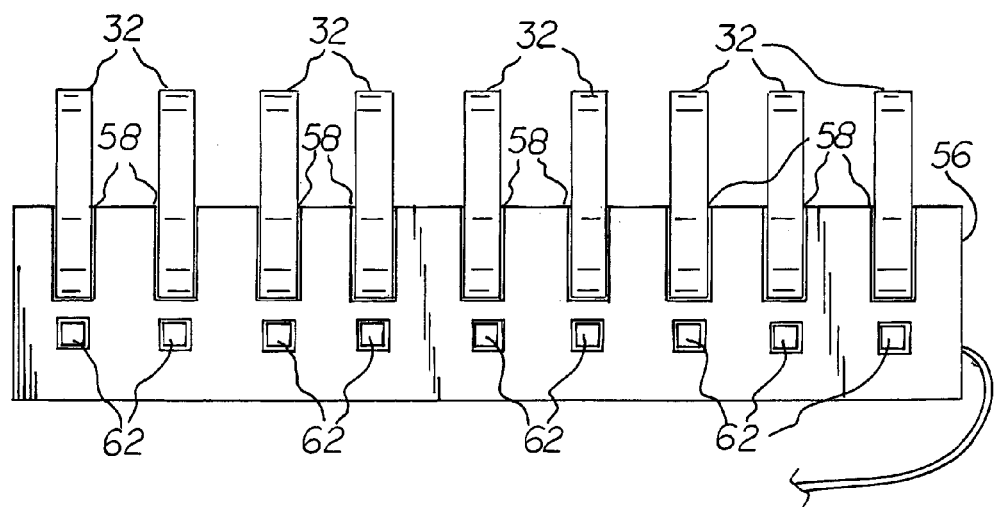
FIG. 5 is a side elevational view showing a number of individual heater assemblies being recharged in a battery charger.
Figure 6:
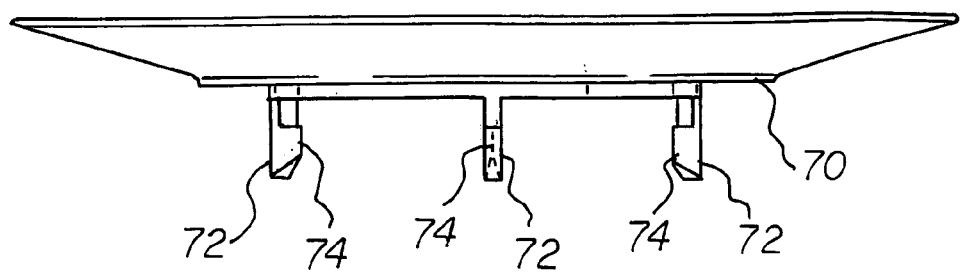
FIG. 6 is a side elevational view of another embodiment of the plate adapter of the present invention.

With heater assembly 32 uncoupled from adapter 24, the heater 32 can be recharged by way of battery charger 56 depicted in FIG. 5. Specifically, battery charger 56 includes a number of slots 58 that are adapted to accept a number of heater assemblies 32 (nine in the depicted embodiment). As a safety feature, charger 56 only accepts properly oriented heater assemblies 32. In the preferred embodiment, the recharging is provided by way of an electromagnetic field. That is, charger 56 generates an electromagnetic field that powers battery 38 within heater 32, thereby eliminating the need for an electrical connector between heater 32 and charger 56. A series of indicator lights 62 are also provided to signify when an individual heater assembly 32 has been sufficiently charged.

Thus, in operation a number of heater assemblies 32 are stored within battery charger 56. When an individual heater 32 has obtained a suitable charge, its indicator light 62 changes color signifying that it is ready to be used. Thereafter heater assembly 32 is removed from battery charger 56 and placed within base fixture 54. Plate adapter 24, with an attached serving plate 22, is then inserted over top of heater assembly 32 within base fixture 54. A mechanism (not shown) within base fixture 54 is then activated, whereby fasteners are inserted from base fixture 54 and into the heater 32 and adapter 24 to thereby secure the two together. Once secured, pressure switches 34 and 46 are closed to complete the circuit within container 52 and initiate heating of coil 36. At this point, serving plate 22, adapter 24, and heater 32 can be picked up as a single unit and used in a fashion similar to a conventional plate. Unlike a conventional plate, however, the plate warming apparatus of the present invention provides a consistent level of heating to the underside of the serving plate, thereby keeping any food warm during the preparation of the meal, its transport, and consumption. In this regard, plate adapter 24 is ideally formed from a material that can efficiently transfer heat from assembly 32 to the underside of plate 22. Once a customer is through with his or her meal, heater assembly 32 can be removed by way of base fixture 54. Thereafter, serving plate 22 and plate adapter 24 can be cleaned in a conventional fashion and reused at a later time.

Figure 7:
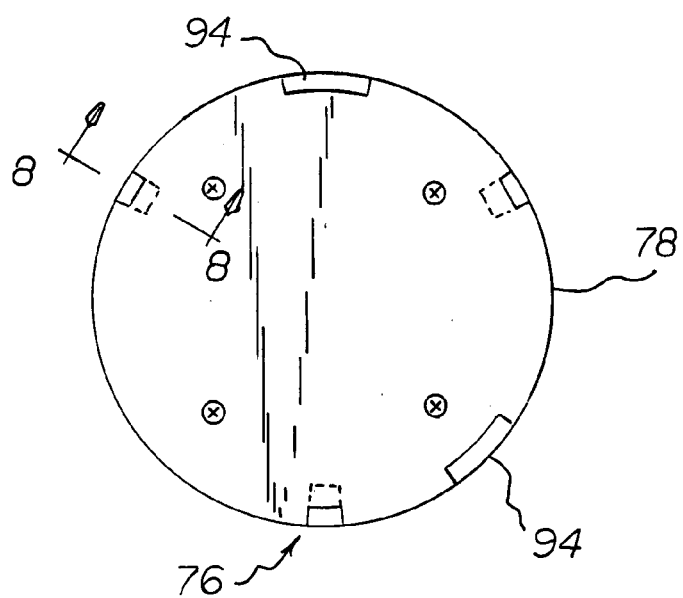
FIG. 7 is a plan view of an alternative heater construction.
Figure 8:
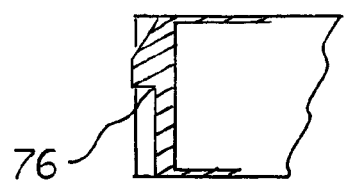
FIG. 8 is a cross-sectional view taken along line 8—8 of FIG. 7.

FIGS. 6–12 illustrate an alternative coupling arrangement for the present invention. In the alternative embodiment, the adapter 70 includes three downwardly extending legs 72, each of which has a tapered enlargement 74 at its lower end. Enlargements 74 are configured to cooperate with corresponding indentations 76 formed within the periphery of the heater assembly 78. The legs 72 of the adapter 70 are such that they can be biased outwardly to fit about the heater assembly 78, with each enlargement 74 being secured below a corresponding indentation 76. In this way, legs 72 are secured such that the adapter 70 cannot be inadvertently removed from heater assembly 78. FIG. 7 also illustrates screws that can be removed to gain access to the interior of heater assembly 78.

The base fixture of the alternative embodiment is described next in conjunction with FIGS. 9–12. The alternative base fixture is comprised of primary and secondary base components (82 and 84, respectively). Primary component 82 includes a centrally located upstanding post 86 that is adapted to be inserted into a corresponding aperture 88 within the secondary component 84. Secondary component 84, in turn, includes a number of peripherally located upstanding arms. Two locator arms 92 are included and are dimensioned to be received within corresponding slots 94 formed within the periphery of the heater assembly 78. By way of locator arms 92, there is only one orientation in which heater assembly 78 can be positioned into secondary component 84. Secondary component 84 also includes three peripherally located stripping arms 96. Stripping arms 96 each have a tapered distal end 98 that is dimensioned to engage an indentation 76 within heater assembly 78. By engaging indentations 76 within heater assembly 78, stripping arms 96 can remove arms 72 of plate adapter 70 and thereby permit adapter 70 to be removed from heater assembly 78.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for heating a meal comprising:
a serving plate having an upper surface and an underside;
a plate adapter with a number of depending legs, each of the legs including an aperture at a lower extent, the shape of the plate adapter corresponding to the shape of the underside of the serving plate, the plate adapter further comprising a pressure switch;
a glue securing the plate adapter to the underside of the serving plate, the glue being dissolvable to thereby allow the plate adapter to be selectively coupled or uncoupled to an existing serving plate;
a heater assembly housing an internal heating element, a rechargeable battery, and opposing electrodes, a pressure switch on an upper surface of the assembly and apertures about the periphery of the assembly, wherein when the pressure switch of the plate adapter and the pressure switch of the heater assembly are engaged, a circuit is completed that activates the internal heating element;
a base fixture including a number of slots adapted to receive the depending legs of the plate adapter and a recess adapted to receive the heater assembly, a coupling mechanism within the base fixture, the coupling mechanism selectively inserting or removing fastening elements through the apertures of the depending legs and periphery of the heater assembly to thereby couple or uncouple the plate adapter from the heater assembly, the coupling mechanism being operative only when the plate adapter and the heater assembly are positioned within the base fixture;
a battery charger for receiving a number of individual heater assemblies after they have been uncoupled from associated plate adapters, the battery charger recharging the rechargeable battery of the heater assemblies via an electromagnetic field.

2. An apparatus for heating a meal comprising:
a serving plate having an upper surface and an underside;
a plate adapter with a number of depending legs coupled to the underside of the serving plate;
a heater assembly housing an internal heating element;

a base fixture including a number of slots adapted to receive the depending legs of the plate adapter and a recess adapted to receive the heater assembly, a coupling mechanism within the base fixture functioning to selectively couple or uncouple the plate adapter and the heater assembly.

3. The apparatus as described in claim 2 further comprising a battery charger for receiving a number of individual heater assemblies after they have been uncoupled from associated plate adapters, the battery charger recharging the rechargeable battery of the heater assemblies via an electromagnetic field.

4. The apparatus as described in claim 2 wherein a glue is used to secure the plate adapter to the underside of the serving plate, and wherein the glue is dissolvable to thereby allow the plate adapter to be selectively coupled or uncoupled to an existing serving plate.

5. The apparatus as described in claim 2 wherein the heating element of the heater assembly is activated with the plate adapter coupled to the heater assembly.

6. An apparatus for heating a meal comprising:

a serving plate having an upper surface and an underside;

a plate adapter with a number of depending legs, the adapter being formed from a heat conductive material;

an adhesive securing the plate adapter to the underside of the serving plate;

a heater assembly housing an internal heating element and a battery, the heater assembly being selectively coupled to the depending legs of the plate adapter, wherein with the heater assembly coupled to the plate adapter a circuit is completed that activates the internal heating element.

7. The apparatus as described in claim 6 wherein the adhesive is dissolvable to allow the apparatus to be used with existing plates.

8. The apparatus as described in claim 6 wherein the battery is rechargeable via an electromagnetic field.

* * * * *